United States Patent

Moriyama et al.

[11] Patent Number: 5,968,682
[45] Date of Patent: Oct. 19, 1999

[54] COATED METAL SHEET FOR BATTERY CONTAINERS, BATTERY CONTAINERS AND BATTERIES PRODUCED THEREOF

[75] Inventors: Hirokazu Moriyama; Hironao Okayama; Hidenori Inai; Hitoshi Ohmura; Akio Miyaji, all of Yamaguchi-ken, Japan

[73] Assignee: Toyo Kohan Co., Ltd., Tokyo-to, Japan

[21] Appl. No.: 09/023,767

[22] Filed: Feb. 13, 1998

Related U.S. Application Data

[62] Division of application No. 08/466,439, Jun. 6, 1995, Pat. No. 5,792,553.

[51] Int. Cl.$^6$ .................................................. H01M 2/02
[52] U.S. Cl. .......................... 429/176; 429/163; 429/164; 429/165
[58] Field of Search .................................... 429/176, 163, 429/164, 165

[56] References Cited

U.S. PATENT DOCUMENTS

| | | |
|---|---|---|
| 4,678,707 | 7/1987 | Shinozaki et al. ...................... 428/323 |
| 5,217,827 | 6/1993 | Fauteux et al. . |
| 5,527,641 | 6/1996 | Koshiishi et al. ...................... 429/163 |

FOREIGN PATENT DOCUMENTS

| | | | |
|---|---|---|---|
| 60-240056 | 1/1987 | Japan | H01M 6/08 |
| 06342653 | 12/1994 | Japan | H01M 2/02 |

OTHER PUBLICATIONS

Patent Abstracts of Japan, JP 06342653 A, Dec. 13, 1994.
Japanese Abstract No. JP 60–240056 A, Jan 19, 1987.
Japanese Abstract No. JP 3–291850 A, Dec. 24, 1991.

*Primary Examiner*—Maria Nuzzolillo
*Assistant Examiner*—Angela J. Martin
*Attorney, Agent, or Firm*—Browdy and Neimark

[57] ABSTRACT

A coated metal sheet for use in a battery container is made up of a metal sheet, one side of which is coated with a coating that includes a resin having rubber elasticity, a plasticizer, a crosslinking agent, and a conductive powder. A battery container or battery is produced from such a coated metal sheet.

1 Claim, 1 Drawing Sheet

COATED METAL SHEET FOR BATTERY CONTAINERS, BATTERY CONTAINERS AND BATTERIES PRODUCED THEREOF

CROSS-REFERENCE TO RELATED APPLICATIONS

The present application is a division of copending parent application Ser. No. 08/466,439, filed Jun. 6, 1995, now U.S. Pat. No. 5,792,553.

BACKGROUND OF THE INVENTION

1. Field of the Invention

The present invention relates to a coated metal sheet that can be used as a battery container for alkaline-manganese batteries, and to battery containers or batteries produced therefrom.

2. Description of the Background Art

Smaller internal resistance is preferred in dry batteries, especially those used as a power supply for a strobo flash in photography where a large current is to be instantly discharged. For an alkaline-manganese battery, the contact resistance between the positive electrode mix, formed into pellets mixed with manganese dioxide as the active material and graphite powder as the conductive material, and the battery container, referred to as the positive electrode can, is the largest of all the internal resistances.

Japanese Patent Laid-open Sho 60-240056 discloses a way of diminishing the contact resistance by forming a conductive coating on the inner surface of the battery container to raise the ratio of active material/conductive material in the positive electrode mix and thereby increase battery life.

However, there are some difficulties encountered in forming a conductive coating on the inner surface of a battery container. As an example, the conductive paint is generally applied by a spraying operation which results in clogging of the spray nozzle or the application of an uneven conductive coating thickness. Furthermore, even if these difficulties can be overcome, the inner surface of every small battery container still needs to be coated with conductive paint, and thus, the poor production efficiency of such a process is reflected in an increase in production cost.

In order to overcome the above-mentioned difficulties, a process involving the coating of a conductive paint on a surface-treated metal sheet, and the subsequent formation of the coated surface-treated steel sheet into a battery container is used in some battery industries, but has not yet succeeded on an industrial scale. One reason for this is that it is difficult to form a battery container from the coated metal sheet without the conductive coating peeling off during the process.

There are several sizes of alkaline-manganese batteries on the market, and some of them are formed by using a severe process. For example, the container for the LR6 dry battery is formed by the following process:

At first, a blank is punched out from a coated metal sheet. Then, the blank is successfully formed into a can having a smaller diameter by drawing (8 to 12 step procedure in the process). The finished battery container has an inner diameter of 13.8 mm, and the total drawing ratio (blank diameter/ inner diameter of finished drawn can) becomes 4.2. It is essential that the formability of the coating is satisfactory along with the coating having the property of excellent adhesion to metal sheets such that the coating does not peel off the metal sheet after being formed by such a severe process.

Thermosetting resins, such as epoxy resin, are used as the main adhesive in conductive paints available on the market for coating the inner surface of a formed battery container. As long as the paint is sprayed on to coat the inner surface of the battery container, and the container is used without further forming, then there is no peeling off of the coating. However, when a metal sheet, previously coated with a conductive paint is drawn, cracks are produced in the coating during forming as the thermosetting resin is generally lacking in formability, and a part of the coating peels off the metal sheet where the peeled coatings become built up in the forming mold, which promotes further peeling off of the coating or sometimes causes damage to the mold. In order to avoid a build up of peeled coatings, which causes the poor production efficiency, the peeled coatings need to be wiped off the mold frequently.

Japanese patent Laid-open Hei 6-342653 discloses a way of reducing the peeling off of coating during the drawing of the coated metal sheet, which involves dipping a metal sheet into chromate solution containing carbon black to provide conductivity to the insulated chromate film, forming a chromate film to improve coating adhesion, and then coating with conductive paint containing epoxy resin, etc. Insofar as a thermosetting resin such as epoxy resin is used as the main component of paint, the poor formability of the coating cannot be overcome and the cracks formed in the coating during the drawing of coated metal sheet cannot be avoided. It is also supposed that the perfect rejection of peeling off of coating is hardly performed.

There is another reason why the battery industry is hesitant in undertaking development of a conductive film coated metal sheet which can be formed by drawing. During the initial stages of developing alkaline-manganese dry batteries, great effort was directed towards preventing the so-called creep phenomenon, a phenomenon caused by the leakage of potassium hydroxide electrolyte from the sealing part of the battery container and cap, and in which more potassium hydroxide electrolyte leaked upon evaporation of moisture from the system. In the alkaline-manganese dry battery on the market, the upper part of its inner surface, which corresponds to the sealing part, is designed not to be coated with conductive paint so as to avoid the creep phenomenon which occurs when conductive paint is applied as a coating on the inner surface of the battery container. Conductive paint can be easily coated on the inner surface of every battery container that is kept partially uncoated in the manner described. When a blank is punched from a coated metal sheet and made into a battery container by drawing, it is extremely hard to coat the conducting paint on a wide metal strip with only on the section corresponding to the sealing part on the inner surface of the battery container being kept uncoated.

On the other hand, polyvinyl butyral as a thermoplastic resin and dibutyl phthalate as a plasticizer are respectively used as a binder for ceramic particles and as a plasticizer when ceramic articles are formed. These compounds are also used in the battery industry.

Japanese patent Laid-open Hei 3-291850 discloses a method of producing positive electrode material of a spiral type lithium battery which involves mixing polyvinyl butyral and dibutyl phthalate with manganese dioxide and graphite powder, and then uniting them with a collector by extruding the mixture and forming a sheet electrode. In this Japanese patent, the inventors of the present invention had formulated a paint, consisting of polyvinyl butyral, dibutyl phthalate, conductive material and solvent, and applied it as a coating on a metal sheet. The coated metal sheet was then formed into a battery container by drawing. The resulting coating film had excellent formability and was drawn comparatively well. However, it had poor adhesion properties and the coating film peeled off at the part known as the ear and is to be cut off at the final forming stage when the coated metal sheet is drawn. When battery containers are continuously mass-produced by drawing, the peeling off of the coated film is undesirable as the peeled films become built up on the drawing mold. In addition, the hardness of the coated film was such that scars easily resulted when the coated metal sheet was drawn or pellets of the positive electrode mix were packed into battery container.

As mentioned above, there is no ready-made or known conductive paint which have the properties of excellent conductivity, formability and adhesion which are the objective of the present invention.

Accordingly, the object of the present invention is to produce a coated metal sheet having excellent formability and adhesion properties when drawn into a battery container, and does not result in peeling of the coated film after drawing. The coated metal sheet also is resistant to the alkali electrolyte packed into the battery container, has excellent conductivity and is sealable at the sealing part upon being formed into battery container.

SUMMARY OF THE INVENTION

The coated metal sheet of the present invention includes a coating of paint on one side of the metal sheet, composed mainly of 100 parts by weight of a resin having rubber elasticity, 50 to 100 parts by weight of a plasticizer, 5 to 50 parts by weight of a cross-linking agent and 20 to 200 parts by weight of a conductive powder. The coating thickness after the paint has dried and baked is in the range of about 0.5 to 15 $\mu$m. For the coated metal sheet, it is preferred that the resin having rubber elasticity be polyvinyl butyral, the plasticizer be dibutyl phthalate, the cross-linking agent be a thermosetting resin, preferably either an epoxy resin, phenolic resin or epoxy-phenolic resin, and the conductive powder be either graphite, carbon black or acetylene black having an average particle diameter in the range of about 10 nm to 10 $\mu$m, respectively.

The battery container of the present invention is preferably produced from the coated metal sheet characterized above.

Additionally, the battery of the present invention in composed of the above-mentioned battery container packed with a positive electrode mix, a conductive material and a negative electrode gel.

DETAILED DESCRIPTION OF THE INVENTION

Figure 1:
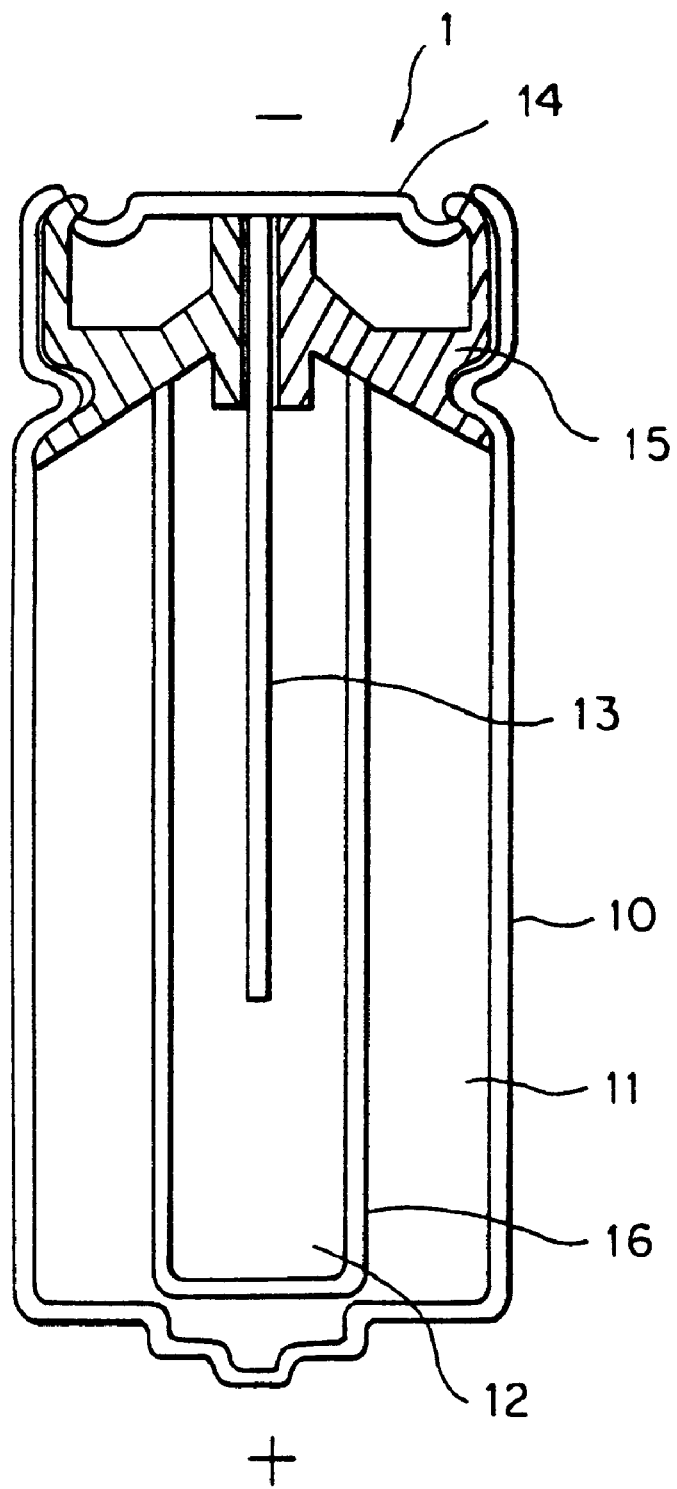
FIG. 1 is a schematic diagram showing the structure of the battery of the present invention. The space between separator 16 (made of non-woven fabric) and the battery container 10, which serves as positive electrode, is filled with the positive electrode mix 11 and the space between separator 16 and collector 13 is filled with the negative electrode gel 12. After filling the battery with positive electrode mix and negative electrode gel, cap 14 which serves as negative electrode, collector 13 and gasket 15 are fitted into battery container 10, and the upper open edge of battery container 10 is then seamed and sealed to cap 14. Battery 1 is produced in this manner.

In the present invention, the stress caused in the coating film during drawing of the coated metal sheet can be reduced. The paint for the coating is composed of a thermoplastic resin having the properties of rubber elasticity, adhesion and hardness of the film, a plasticizer, a small amount of crosslinking agent in order to reinforce the coating film and a conductive powder. This paint is coated on a metal sheet to a thickness in the range of about 0.5 to 15 $\mu$m, and then dried and baked. During the baking step, crosslinking is obtained between the hydroxyl groups contained in the thermoplastic resin and the crosslinking agent, resulting in a coated metal sheet that has sufficient formability and adhesiveness for the drawing process. Thus, battery containers and batteries with excellent battery performance characteristics can be made from the coated metal sheet.

The thermoplastic resins preferably used in the present invention are polyvinyl ether, polyvinyl isobutyl ether or polyvinyl butyral. Polyvinyl butyral (hereinafter referred to as PVB) is most preferable with regard to adhesion, alkali resistance and compatibility with other resins.

Preferable plasticizers are glycols such as triethylene glycol, polyethylene glycol or diethyl butyrate, aliphatic dibasic acid esters such as dibutyl phthalate, dioctyl phthalate, dioctyl adipate or dioctyl sebacate, or triester phosphates such as tricresyl phosphate or trioctyl phosphate. Dibutyl phthalate (hereinafter referred to as DBP) is most preferable with regard to stability and compatibility with PVB.

The invention is hereinafter described by way of the embodiment in which PVB and DBP are used as thermoplastic resin and as plasticizer, respectively.

Preferable crosslinking agents added to PVB and DBP in order to reinforce the coated film and improve hardness and adhesion of the film are thermosetting resins such as epoxy resin, epoxy-phenolic resin, phenolic resin, urea resin, melamine resin, unsaturated polyester resin or alkyd resin. Among the thermosetting resins, phenolic resins, or epoxy based resins such as epoxy resin or epoxy-phenolic resin, are most preferred. These resins are preferably added at the minimum amount needed to provide excellent adhesion of the coating film and characterized by not peeling off even when the coated metal sheet is drawn into a battery container and the battery container is subsequently degreased and rinsed after drawing. As phenolic resins or epoxy resins are non-conductive materials, the addition of too much resin would deteriorate the conductivity of the coating. Accordingly, it is preferred that these resins have an average molecular weight of less than 1000.

The addition of more phenolic resin or epoxy resin can have the effect of increasing the hardness of the coating up to a certain amount, beyond which addition of more phenolic or epoxy resin has no further effect on hardness. Preferable amounts of phenolic resin or epoxy resin to be added to PVB as the thermoplastic resin having rubber elasticity is in the range of about 10 to 50 parts by weight.

Any phenolic resin or epoxy based resin, such as epoxy resin or epoxy-phenolic resin, can be applied to the conductive paint of the present invention.

Graphite powder, carbon black or acetylene black, all of which have carbon for an ingredient, can be applied as the conductive powder in the conductive coating of the present invention. Preferably, the conductive powder has a particle diameter in the range of 10 nm to 10 $\mu$m. The particle size of obtainable graphite powder is larger than that of carbon black or acetylene black. When a metal sheet coated with a conductive coating containing graphite powder is drawn, adhesion of the coating, and sealability at the sealing part when the battery container made of the above-mentioned coated metal sheet is filled with electrolyte and sealed with a cap, are slightly poorer than with carbon black or acetylene black as conductive powder.

On the other hand, acetylene black has the advantage that only a small amount need be added to the paint to provide sufficient conductivity in the coating film. However, since acetylene black has 0.1 of apparent bulk density, which is a very low value for bulk density, it is easily disturbed and carried off by a slight wind or disturbance. It is also slightly lacking in workability during manufacture of the conductive paint. Carbon black, having particle diameter which is apparently between that of graphite powder and that of acetylene black, is the most preferable conductive powder because it affords excellent coating film adhesion and workability during paint manufacture.

In the manufacture of the conductive paint, while the addition of less than 20 parts by weight of the conductive powder to 100 parts by weight of resin having rubber elasticity provides insufficient conductivity in the coating film, the addition of more than 200 weight parts of the conductive powder affects the coating film by producing sufficiently poor adhesion characteristics that makes the coating film impractical commercially. The preferable range is 40 to 160 parts by weight of conductive paint added per 100 parts by weight of resin having rubber elasticity.

Furthermore, the addition of less than 50 parts by weight of the plasticizer to 100 parts by weight of resin having rubber elasticity was determined to provide insufficient rubber elasticity to the coating film. However, when more than 100 parts by weight of the plasticizer is added to the resin having rubber elasticity, the tackiness of the coating film remains and does not disappear with the effect that the coating film does not become dry.

The amount of solvent used to dissolve the resin having rubber elasticity and to adjust the viscosity of the paint to that suitable for painting is not particularly limited. However, 500 to 1000 parts by weight of solvent to 100 parts by weight of resin having rubber elasticity is preferable. The type of solvent used depends on the resin having rubber elasticity or on the crosslinking agent. The solvent can be one solvent or a solvent mixture consisting of more than two of the solvents listed below being selected with consideration for the solubility of the resin and the evaporation rate of the solvent. Preferred solvents are alcohols such as methanol, ethanol, n-propanol, iso-propanol, n-butanol, iso-butanol, 1-butanol, 2-butanol, n-heptanol or n-hexanol, ketones such as acetone, methyl ethyl ketone or methyl iso-butyl ketone, or acetate esters such as methyl acetate, ethyl acetate or n-butyl acetate.

When a metal sheet having a conductive film thickness of less than 0.5 $\mu$m is drawn into a battery container, damage occurs to the conductive coating film, in the form of cracks in the film or the peeling off of the film. A coating film thickness of less than 0.5 $\mu$m is insufficient for relaxing the stress strain even if the conductive coating film of the present invention has the rubber elasticity to relax the stress strain caused by the drawing process. For the case where the coating film thickness is more than 15 $\mu$m, the effect of film thickness on the relaxing of stress strain is saturated, and such an increased film thickness only serves to increase painting cost and is economically impractical. The preferred range of coating film thickness is from about 1 to 10 $\mu$m. Insofar as the coating film thickness falls within the above-mentioned range, no cracks in the film or peeling off of the film is observed even when a scanning type electron microscope is used to scan the inner surface of the battery container after drawing. When the thickness of the coating film falls within the above-mentioned preferred range, the coating film of the coated metal sheet drawn into a battery container can control metal dissolution into electrolyte and prevent the deterioration of battery performance caused by such dissolution of metal substrate. In addition, the creep phenomenon of electrolyte leaking through the part where the coated film peels off is also prevented when the coating film thickness is within the preferred range of thickness, with the result that the sealability of the electrolyte can likewise be satisfactorily maintained.

The conductive paint of the present invention can be coated onto a metal sheet by roll coating, curtain flow coating, spray coating or dip coating, all which are generally practiced in the painting of metal sheets. Roll coating, however, is more preferable in that it can uniformly coat a wide area.

The metal sheet or substrate to be coated with the conductive paint according to the present invention can be selected from the group of metal sheets generally used for battery containers and consisting of nickel-plated steel sheet, steel sheet plated with nickel followed by heat treatment, nickel-tin alloy plated steel sheet, steel sheet plated with nickel-tin alloy followed by heat treatment, steel sheet first plated with a layer of nickel, then plated with a layer of tin followed by heat treatment, stainless steel sheet, nickel or nickel-tin alloy plated stainless steel sheet. In order to improve the adhesion of the coating film to the metal sheet, the metal sheet can also be covered with a layer of hydrated chromium oxide formed by electrolytical treatment or dip treatment in dichromate solution to a thickness where the conductivity of the coated film is not extensively deteriorated.

The present invention is described in further detail by example.

At first, the following metal substrates to be coated with conductive paint were prepared as follows:

1) N type steel sheet

A 0.25 mm thick steel sheet was plated with a 2 $\mu$m thick nickel layer, and then heat treated in a anti-oxidant atmosphere at 550° C. for 6 hours, to produce a nickel diffused steel sheet in which nickel is diffused into the steel. (Hereinafter referred to as N type steel sheet.)

2) N-S type steel sheet

A 0.25 mm thick steel sheet was plated with a 2 $\mu$m thick nickel layer. Subsequently, the nickel plated steel sheet was further plated with 2.8 g/m$^2$ of tin, and then heat treated in an anti-oxidant atmosphere at 550° C. for 6 hours, which produced a nickel-tin diffused steel sheet in which nickel is diffused into the steel as well as forming an intermetallic nickel-tin compound. (Hereinafter referred to as N-S type steel sheet.)

3) SUS 304 stainless steel sheet 0.25 mm thick 18Cr—8Ni stainless steel.

Secondly, conductive paint was prepared as follows:

Either graphite powder (average particle diameter: 3 to 10 $\mu$m), carbon black (manufactured by HAYASHI PURE CHEMICAL LTD.) or acetylene black (manufactured by DENKI KAGAKU KOGYO KABUSHIKI KAISHA) was used as the conductive material. The binder used was composed of PVB (DENKA Butyral #3000-k manufactured by DENKI KAGAKU KOGYO KABUSHIKI KAISHA) as the resin having rubber elasticity, DBP as the plasticizer, and either epoxy resin (EPO Mount manufactured by REFINE TEC LTD.), epoxy-phenolic resin (manufactured by TOYO INK MANUFACTURING CO., LTD.) or phenolic resin (SUMILITE RESIN manufactured by SUMITOMO DUREZ COMPANY, LTD.) as the crosslinking agent. The conductive powder and binder were dissolved and dispersed in a solvent or a solvent mixture selected from the group consisting of methanol, ethanol, n-butanol, n-heptanol, n-hexanol, acetone, methyl ethyl ketone, or methyl isobutyl ketone. The conductive paint was prepared in this manner. The viscosity of the paint was adjusted to 50 to 200 poise by the amount of solvent.

After the metal sheets described above were electrolytically degreased, pickled and dried, conductive paint described immediately above was coated onto the metal sheets, and the coated metal sheets were then heated at 200° C. for 3 minutes in order to evaporate the solvent and bake the paint coating. In this manner, the conductive film coated metal sheets presented in Tables 1 to 3 were prepared.

TABLE 1

| Discrimination | | | | Example | | | | | | | |
|---|---|---|---|---|---|---|---|---|---|---|---|
| No | | | | 1 | 2 | 3 | 4 | 5 | 6 | 7 | 8 |
| Composition of conductive paint | Metal sheet | | | | | | | N-S | | | |
| | PVB (wp$^8$) | | | | | | | 100 | | | |
| | DBP (wp) | | | 50 | 75 | 100 | | | | 75 | |
| | Cross linking agent | Resin | | | | | E* | | | | E-P** |
| | | (wp) | | | 30 | | | 5 | 50 | | 30 |
| | Conductive material | Powder | | | | | CB* | | | | |
| | | (wp) | | | | | | 100 | | 50 | 150 |
| | Coated film thickness (μm) | | | 9 | 8 | 9 | 10 | 9 | 8 | | 10 |

Remarks
wp$^8$: weight part,
E*: Epoxy resin,
E-P**: Epoxy-Phenolic resin,
CB*: Carbon black

TABLE 2

| Discrimination | | | | Example | | | | | | | |
|---|---|---|---|---|---|---|---|---|---|---|---|
| No | | | | 9 | 10 | 11 | 12 | 13 | 14 | 15 | 16 |
| Composition of conductive paint | Metal sheet | | | | N-S | | N | SUS | | N-S | |
| | PVB (wp) | | | | | | 100 | | | | |
| | DBP (wp) | | | | | | 75 | | | | |
| | Cross linking agent | Resin | | | E-P | | | | P*** | | |
| | | (wp) | | | | | 30 | | | | |
| | Conductive material | Powder | | CB | AB** | Graphite | | | CB | | |
| | | (wp) | | | 100 | 150 | | | 100 | | |
| | Coated film thickness (μm) | | | 9 | | 8 | 10 | 9 | 0.5 | 15 | |

Remarks
P***: Phenolic resin,
AB**: Acetylene black

TABLE 3

| Discrimination | | | Comparative Example | | | | | | | | |
|---|---|---|---|---|---|---|---|---|---|---|---|
| No | | | 17 | 18 | 19 | 20 | 21 | 22 | 23 | 24 | 25 |
| Composition of conductive paint | Metal sheet | | | | | N-S | | | | N | N-S Uncoated |
| | PVB (wp[8]) | | | | | 100 | | | | | |
| | DBP (wp) | | | 30 | 140 | | | 75 | | | |
| | Cross linking agent | Resin (wp) | | 30 | 3 | E 65 | | | 30 | | |
| | Conductive material | Powder (wp) | | | 100 | CB | | 18 | 220 | 100 | |
| Coated film thickness (μm) | | | | 9 | 8 | 10 | | 8 | | | 0.3 |

The performance of the conductive film coated metal sheets and the performance of a battery manufactured therefrom were evaluated and graded on the following points, with the results being shown in Tables 4 to 6.

1) Dispersion of the conductive powder in the coated film

After agitating the conductive paint for 3 hours, it was coated onto the metal sheet, and then the coated metal sheet was dried. The dispersion of the conductive powder in the dried coated film was observed and evaluated with a microscope at 400×magnification.

Grading scale for evaluation good: No cohesion of the conductive powder was observed.

fair: A little cohesion of the conductive powder was observed.

poor: Cohesion of the conductive powder was observed.

2) Adhesion of the conductive film coating

After applying SCOTCH tape (cellphane adhesive tape) on the coated film of the conductive film coated metal sheet, the SCOTCH tape was peeled off. Adhesion of the conductive film coating was evaluated as to the extent the coating film stuck to the SCOTCH tape and was peeled off with the SCOTCH tape.

Grading scale for evaluation good: No peeling off of the film was observed.

poor: Peeling off of the film was observed.

3) Hardness of the conductive film coating

Hardness of the conductive film coating was evaluated with a pencil scratch tester (load: 100 g).

4) Electrical resistance of the conductive film coating

Electrical resistance on the surface of the conductive film coating was measured with a volt-ohm-milliammeter.

5) Adhesion of the conductive film coating after drawing

A blank having a diameter of 58 mm was punched out from the coated metal sheet and then formed into a battery container (can) 10 (FIG. 1) with a diameter of 13.8 mm by drawing (total drawing ratio: 4.2). The peeling off of the coated film was evaluated with the naked eye prior to cutting off the upper part of the battery container (so called ear).

Grading scale for evaluation excellent: No peeling off was observed anywhere.

good: Only a little peeling off was observed at the upper edge part of the battery container.

fair: Peeling off was partially observed at the upper part of the battery container.

poor: Peeling off was observed over a considerable portion of the battery container.

6) Performance of battery manufactured from the above-mentioned battery containers.

Batteries were manufactured using the above-mentioned battery container having good coating film adhesion after drawing. At first, the positive electrode mix, composed of electrolytic manganese dioxide as the positive electrode active material and graphite powder as the conductive material with the potassium hydroxide solution as the electrolyte, and the negative electrode gel, composed of potassium hydroxide electrolyte saturated with zinc oxide added with gelatanizer and granular zinc, were prepared. Secondly, positive electrode mix 11 the space between separator 16, made of non-woven fabric, and battery container 10, which serves as the positive electrode, was filled with positive electrode mix 11, and the space between separator 16 and collector 13 was filled with negative electrode gel 12 (FIG. 1). Subsequently, cap 14, which serves as the negative electrode, collector 13 and gasket 15 were all fitted into battery container 10, and the upper open edge of battery container 10 was seamed and sealed with cap 14.

Batteries were stored in 95% humidity at 60° C. for 4 weeks, after which the voltage, internal resistance and short-circuit current of the batteries were measured. Internal resistance was measured by the A.C. impedance method after connecting a A.C. volt-ohm-milliammeter between the positive and negative electrodes.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

TABLE 4

| Discrimination | | Example | | | | | | | |
|---|---|---|---|---|---|---|---|---|---|
| No | | 1 | 2 | 3 | 4 | 5 | 6 | 7 | 8 |
| Performance of coated film | Powder dispersion | good | good | good | good | good | good | good | good |
| | Adhesion (BD+) | good | good | good | good | good | good | good | good |
| | Hardness (Pencil) | 7H | 7H | 7H | 5H | 8H | 7H | 7H | 6H |
| | Film resistance (Ω) | 16 | 15 | 15 | 14 | 17 | 15 | 27 | 12 |
| | Adhesion (AD++) | excellent | excellent | excellent | good | excellent | excellent | excellent | good |
| Performance of battery | Voltage (V) | 1.6 | 1.6 | 1.6 | 1.6 | 1.6 | 1.6 | 1.6 | 1.6 |
| | Short-circuit C.7 (A) | 13.1 | 13.1 | 13.2 | 13.1 | 13.0 | 13.1 | 9.3 | 13.6 |
| | Internal resistance (mΩ) | 109 | 110 | 108 | 109 | 111 | 109 | 156 | 103 |

Remarks
BD+: Before drawing,
AD++: After drawing,
Short-circuit C.7 : Short-circuit current

TABLE 5

| Discrimination | | Example | | | | | | | |
|---|---|---|---|---|---|---|---|---|---|
| No | | 9 | 10 | 11 | 12 | 13 | 14 | 15 | 16 |
| Performance of coated film | Powder dispersion | good | good | good | good | good | good | good | good |
| | Adhesion (BD+) | good | good | good | good | good | good | good | good |
| | Hardness (Pencil) | 7H | 8H | 6H | 7H | 7H | 5H | 7H | 7H |
| | Film resistance (Ω) | 15 | 10 | 36 | 15 | 16 | 15 | 15 | 17 |
| | Adhesion (AD++) | excellent | excellent | good | excellent | excellent | good | excellent | excellent |
| Performace of battery | Voltage (V) | 1.6 | 1.6 | 1.6 | 1.6 | 1.6 | 1.6 | 1.6 | 1.6 |
| | Short-circuit C.7 (A) | 13.1 | 13.4 | 10.4 | 9.2 | 8.9 | 12.3 | 12.2 | 13.0 |
| | Internal resistance (mΩ) | 110 | 106 | 134 | 150 | 155 | 120 | 121 | 111 |

TABLE 6

| Discrimination | | Comparative Example | | | | | | | | |
|---|---|---|---|---|---|---|---|---|---|---|
| No | | 17 | 18 | 19 | 20 | 21 | 22 | 23 | 24 | 25 |
| Performance of coated film | Powder dispersion | good | good | good | good | good | good | good | Uncoated | |
| | Adhesion (BD+) | poor | poor+++ | good | good | good | good | good | | |
| | Hardness (Pencil) | — | — | 2H | 8H | 7H | 5H | 4H | | |
| | Film Resistance (Ω) | — | — | 13 | 18 | 1200 | 11 | 12 | | |
| | Adhesion (AD++) | — | — | poor | fair | — | fair | fair | | |
| Performance of battery | Voltage (V) | — | — | — | — | — | — | — | 1.6 | 1.6 |
| | Short-circuit C.7 (A) | — | — | — | — | — | — | — | 5.5 | 6.0 |
| | Internal resistance (mΩ) | — | — | — | — | — | — | — | 185 | 180 |

Remarks
poor+++: Film did not dry.
—: not evaluated

What is claimed is:

1. A battery, comprising:

a battery container having an inner surface and an outer surface, said battery container being drawn from a coated metal sheet comprising a metal sheet having two surfaces and a paint coating on one surface of said two surfaces to form a paint coating surface as said inner surface of said battery container, wherein said paint coating has a composition comprising 100 parts by weight of a thermoplastic resin having elasticity, 50 to 100 parts by weight of a plasticizer, 5 to 50 parts by weight of a crosslinking agent to improve the hardness properties of said paint coating, and 20 to 200 parts by weight of a conductive powder, said paint coating having a thickness in the range of about 0.5 to 15 μm;

a separator inserted within said battery container to form two compartments therein, wherein:

first of said two compartments, being formed between said separator and said battery container, is filled with a positive electrode mix; and second of said two compartments, being formed by said separator, is filled with a negative electrode gel.

* * * * *